No. 790,240. PATENTED MAY 16, 1905.
W. S. WOODS.
NUT LOCK.
APPLICATION FILED MAR. 11, 1905.

Witnesses:
Addison A. Adams
Ethel A. Seller

Inventor,
William S. Woods
By Chappell & Earl
Att'y's

No. 790,240. Patented May 16, 1905.

UNITED STATES PATENT OFFICE.

WILLIAM S. WOODS, OF BENTON HARBOR, MICHIGAN.

NUT-LOCK.

SPECIFICATION forming part of Letters Patent No. 790,240, dated May 16, 1905.

Application filed March 11, 1905. Serial No. 249,603.

*To all whom it may concern:*

Be it known that I, WILLIAM S. WOODS, a citizen of the United States, residing at the city of Benton Harbor, in the county of Berrien and State of Michigan, have invented certain new and useful Improvements in Nut-Locks, of which the following is a specification.

This invention relates to improvements in nut-locks.

The main object of this invention is to provide an improved nut-lock which is very secure and at the same time is very easily and quickly manipulated.

Further objects and objects relating to structural details will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawings, forming a part of this specification, in which—

Figure 1:
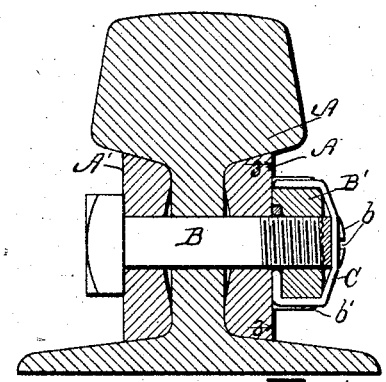
Figure 2:
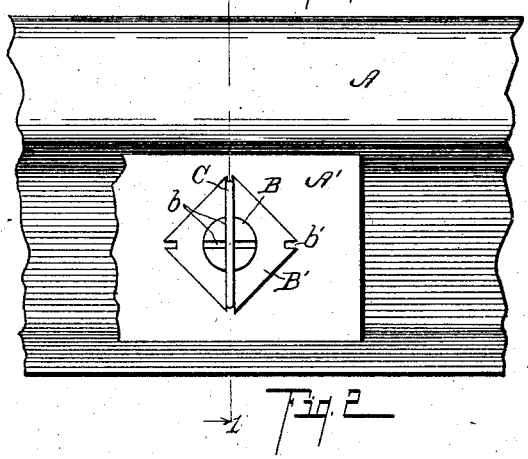
Figures 3, 4:
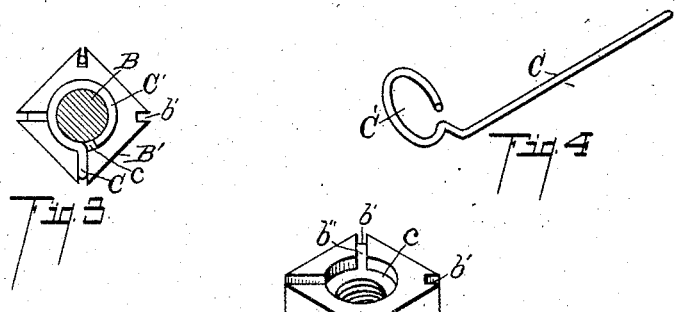
Figure 5:
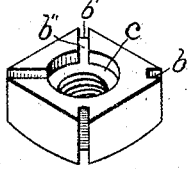

Figure 1 is a cross-sectional view taken on a line corresponding to line 1 1 of Fig. 2 of a structure embodying the features of my invention, the bolt B being shown in full lines. Fig. 2 is a detail side elevation view looking from the right of Fig. 1. Fig. 3 is a detail sectional view taken on a line corresponding to line 3 3 of Fig. 1, showing the inner face of the nut B. Fig. 4 is a perspective view of a locking-wire or fastener C. Fig. 5 is a perspective view of the nut B in an inverted position.

In the drawings the sectional views are taken looking in the direction of the little arrows at the ends of the section-lines, and similar letters of reference refer to similar parts throughout the several views.

Referring to the drawings, in which my improved nut-lock is shown in connection with a railway-rail, A is the rail, and A' A' are the fish-plates.

The end of the bolt B is provided with radial grooves $b$, adapted to receive the locking-wire or fastener C. The nut B' is provided with an annular seat $c$ in its inner face adapted to receive the eye C' of the locking-wire or fastener. When the eye C' is in its seat, it is in position to receive the bolt. The nut B' is provided with cross-grooves $b'$ at its corners and with one or more radial grooves $b''$ in its inner face. The grooves $b''$ open into the seat $c$ and into one of the corner-grooves $b'$, so that when the eye C' is in its seat the stem portion of the fastener will rest in one of the grooves $b'$. The seat $c$ and grooves $b''$ are preferably of such depth that the locking-wire lies flush with the inner face of the nut. Thus arranged the locking-wire is secured and the inner face of the nut lies flat against the plate A'. After the nut is tightened into place the free end of the locking-wire is bent across the end of the bolt and forced down into one of the grooves $b$ therein. The end of the wire is then bent down into a groove $b'$ opposite the end of the groove $b$ in the bolt and secured therein by upsetting the sides of the groove thereon. (See Fig. 3.) On account of the location of the grooves $b'$ at the corners of the nut comparatively thin lips are formed, which may be clamped upon the locking-wire by a light blow of the hammer. A further advantage secured by placing the grooves $b$ at the corner of the nut is that the nut is not weakened thereby. By thus forming and arranging the parts the nut is locked to the bolt in a very effective manner. It is quickly applied and, if desired, may be readily released by severing the locking-wire. The bolt can, if desired, be used again by substituting a new locking-wire.

I have illustrated and described my improved nut-lock in detail in the form preferred by me, although I am aware that it is capable of variation in structural details without departing from my invention.

Having thus described my invention, what I claim as new, and desire to secure by Letters Patent, is—

1. In a nut-lock, the combination of a bolt having a transverse groove in the end thereof; a nut having cross-grooves in its corners and an annular seat in its inner face, and having a groove connecting said seat to one of said corner-grooves; and a locking-wire or fastener having an eye at its inner end arranged in said seat in said nut, and in a corner-groove thereof, through the groove in the end of said bolt to the opposite corner-groove in said nut, in which it is secured by upsetting the sides thereof, for the purpose specified.

2. In a nut-lock, the combination of a bolt having a transverse groove in the end thereof; a nut having cross-grooves in its corners and an annular seat in its inner face; and a locking-wire or fastener having an eye in its inner end arranged in said seat in said nut, and in a corner-groove thereof, through the groove in the end of said bolt to the opposite corner-groove in said nut, in which it is secured by upsetting the sides thereof, for the purpose specified.

3. In a nut-lock, the combination of a bolt having a transverse groove in the end thereof; a nut having cross-grooves in its corners and an annular seat in its inner face, and having a groove connecting said seat to one of said corner-grooves; and a locking-wire or fastener having an eye at its inner end arranged in said seat in said nut, and in a corner-groove thereof, through the groove in the end of said bolt to the opposite corner-groove in said nut, for the purpose specified.

4. In a nut-lock, the combination of a bolt having a transverse groove in the end thereof; a nut having cross-grooves in its corners and an annular seat in its inner face; and a locking-wire or fastener having an eye in its inner end arranged in said seat in said nut, and in a corner-groove thereof, through the groove in the end of said bolt to the opposite corner-groove in said nut, for the purpose specified.

5. In a nut-lock, the combination of a bolt having a transverse groove in the end thereof; a nut having cross-grooves and an annular seat in its inner face; and a locking-wire or fastener having an eye at its inner end adapted to be arranged in said seat in said nut, and in a cross-groove thereof, through the groove in the end of said bolt to the opposite cross-groove in said nut, for the purpose specified.

6. In a nut-lock, the combination of a bolt having a groove in the end thereof; a nut having cross-grooves in its corners; and a locking-wire or fastener having an eye at its inner end adapted to receive said bolt, said fastener being adapted to be arranged in a cross-groove of said nut, through the groove in the end of said bolt to the opposite cross-groove in said nut, in which it may be secured by upsetting the sides thereof, for the purpose specified.

In witness whereof I have hereunto set my hand and seal in presence of two witnesses.

WILLIAM S. WOODS. [L. S.]

Witnesses:
B. F. WELLS,
G. L. VALENTINE.